United States Patent [19]
Huber et al.

[11] 3,949,399
[45] Apr. 6, 1976

[54] AUTOMATIC DIRECTION FINDING EQUIPMENT FOR AIRPLANES

[75] Inventors: Franz R. Huber, Assling; A. Mattes, Munich, both of Germany

[73] Assignee: Rohde & Schwarz, Munich, Germany

[22] Filed: May 22, 1974

[21] Appl. No.: 472,414

[30] Foreign Application Priority Data
May 24, 1973 Germany............................ 2326521

[52] U.S. Cl.. 343/100 CS; 343/112 TC; 340/27 NA
[51] Int. Cl.²........................................... H04B 7/00
[58] Field of Search.... 343/112 TC, 113 R, 100 CS; 340/27 NA; 346/8

[56] References Cited
UNITED STATES PATENTS

| | | |
|---|---|---|
| 2,165,256 | 7/1939 | Hansell .............................. 343/109 |
| 3,096,513 | 7/1963 | Cutler ............................... 343/5 GC |
| 3,766,552 | 10/1973 | Hajduk........................... 343/100 CS |
| 3,840,877 | 10/1974 | Crane ................................. 343/102 |
| 3,873,982 | 3/1975 | Cardon et al. .................. 343/117 R |

*Primary Examiner*—Maynard R. Wilbur
*Assistant Examiner*—T. M. Blum
*Attorney, Agent, or Firm*—Hill, Gross, Simpson, Van Santen, Steadman, Chiara & Simpson

[57] ABSTRACT

An automatic direction finding system for an airplane which utilizes ground equipment for automatically determining the line of position of aircraft transmitting radiant energy and which calculates the aircraft's line of position and transmits such line of position to the aircraft over an available audio channel. The ground station may be unmanned and provides for storage means for converting the aircraft's bearing from the station into an audible message which can be automatically transmitted to the aircraft.

7 Claims, 1 Drawing Figure

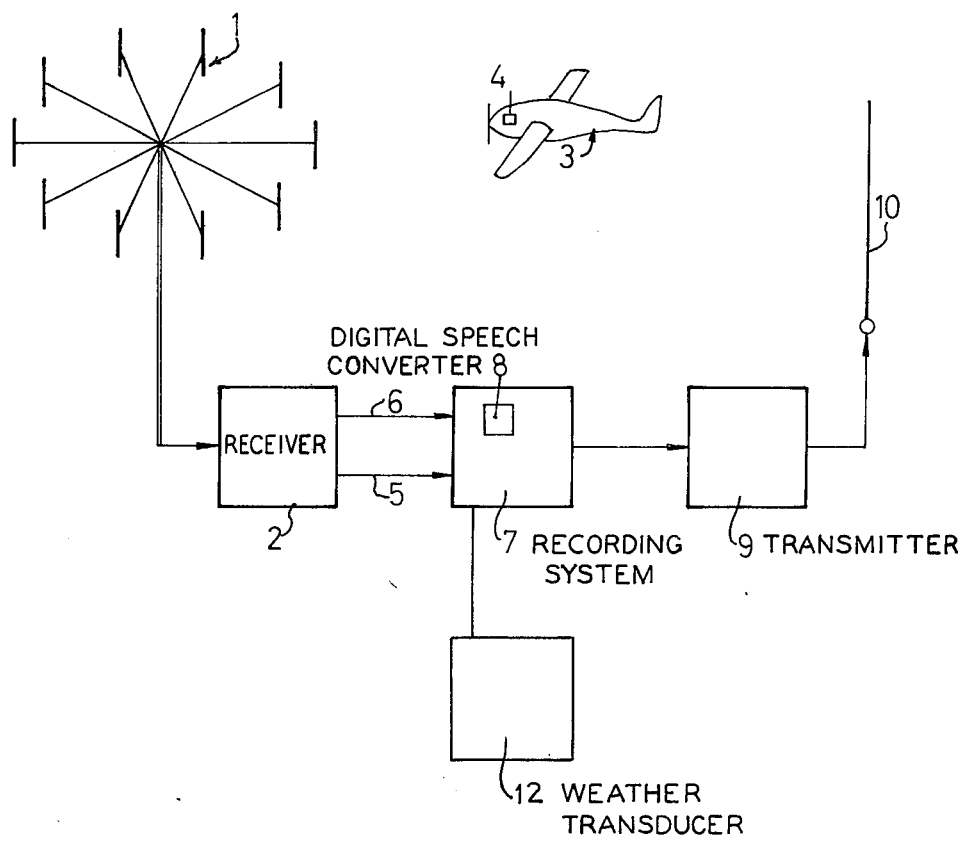

AUTOMATIC DIRECTION FINDING EQUIPMENT FOR AIRPLANES

BACKGROUND OF THE INVENTION

1. Field of the Invention

This invention relates in general to aircraft navigation systems and in particular to a system for automatically transmitting an aircraft's line of position from a ground station.

2. Description of the Prior Art

Many aircraft navigation aids and systems are presently available but most of them require elaborate equipment wherein bearing and distance information is suitably encoded and detected with elaborate equipment on the aircraft and on the ground. Such systems as TVOR-DME and LORAN are examples of such systems. Other systems utilized are ground based surveillance radar wherein an operator on the ground continuously monitors positions of aircraft and can, when requested, relay such position to the aircraft.

Many small airports cannot afford the elaborate systems; and, in fact, many ground stations operate with no permanent personnel on duty. Also, many aircraft cannot afford expensive navigation systems; however, such aircrafts generally carry a radio telephone transmitting and receiving equipment.

SUMMARY OF THE INVENTION

The present invention provides an automatic direction finding system for airplanes which are equiped with radio telephones on board and wherein at least one direction finder on the ground receives radiation from the aircraft and automatically determines a line of position to the aircraft and transmits at least the line of position to the aircraft over an audio channel. The aircraft can obtain a fix by interrogating a second station to obtain a second line of position.

Many small airports are not continuously manned and thus do not have personnel available to respond to the radio request of the pilots asking for lines of positions. Also, many smaller airports do not have automatic landing aids such as instrument landing systems or complex navigation equipment.

The present invention allows the pilot to utilize only his radio telephone navigation and receiving equipment which are present in nearly all aircraft and to transmit to the ground station an audio message and wherein in the ground station an automatic direction finding equipment computes the direction of the aircraft from the station and then converts such information into an audio signal which is transmitted from the ground station to the pilot over the radio telephone network.

The invention does not require any additional equipment or changes of the apparatus on the aircraft and the common VHF radio telephone devices operating on the assigned frequencies in their respective countries are sufficient for use with the present invention. Only minor changes and additions need be made at the ground stations so as to allow the pilot to obtain fully automatically the line of position from the ground station even though there are no personnel at the ground station. The additional costs for modifying the radio direction finder ground station is very low as compared to the cost of systems for accomplishing the same results mounted on board the aircraft or as compared with continuously providing ground personnel at the ground station for orally responding to interrogations from the pilots. The present invention also has the advantage that it can be simply and cheaply inserted into existing direction finding stations. Means are also provided so that the pilot can easily identify the return message giving his line of position from the ground station in that a part of his own message may be automatically returned together with the line of position.

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

BRIEF DESCRIPTION OF THE DRAWING

The FIGURE illustrates in block form the novel direction finding apparatus of the invention.

DESCRIPTION OF THE PREFERRED EMBODIMENTS

The FIGURE illustrates an automatically operating radio direction finder comprising an antenna system 1 and a receiver 2 which receives the output of the antenna. The antenna 1 and receiver 2 might comprise known prior art automatic radio direction finders, as for example, large-base doppler direction finders which produce an output indicative of the line of position of an aircraft 3 from the antenna. The aircraft 3 has a radio telephone transmitter-receiver 4 which operates in the same frequency range as the radio direction finder, as for example, on a fixed frequency of a 122.5 MHz. Thus, when the aircraft 3 transmits from the radio telephone 4 at this frequency, the ground base direction finding system will produce at the output of the receiver 2 on the output 5 the line of position from the radio station of the aircraft 3. Such output may be in analog form or may be in a suitable code as for example in the binary or BCD code. In addition to the angular line of position on output 5 from the receiver 2 the audio message transmitted by the pilot in the aircraft 3 will appear at the output 6 of the receiver 2. The outputs 5 and 6 of the direction finder receiver 2 are connected to a recording and storing system 7 which stores at least a part of the message supplied by the input 6 and also stores the line of position information on output 5. The recording system 7 may include a magnetic plate, a magnetic tape, or a magnetic cylinder for storing the information on inputs 5 and 6. In the recording system 7 is a prior art converter 8 which has its output connected to a transmitter 9 operating at the same frequency as the radio telephone device 4 and the line of position after being converted into an audio form is radiated from the transmitter 9 via the antenna 10. In operation, the pilot of the airplane 3 tunes his radio telephone transmitter receiver to the frequency of the receiver 2 and transmits a request for his bearing or line of position from the ground station. This signal is automatically received by the direction finder receiver 2 at the airport and the line of position of the aircraft from the ground station will be automatically calculated and will appear on the output 5 of the receiver 2. At the same time, a portion of the received message from the pilot or all of it will be on the output 6 of the receiver 2 and will be stored in the recording system 7.

The recording system 7 can convert the bearing information on output 5 into a suitable audible signal in a number of ways. For example, if the angular information on output 5 is given in the form of a multi-digital value in a suitable code, it can be converted in the digital speech converter 8 into a speech text corresponding to the angle value which can be stored in the recording system 7. After the radio call from the aircraft has terminated and direction finding process has been finished, the modulator of the transmitter 9 receives the stored angular direction information stored in the recording system 7 and it then radiates to the aircraft 3 the following speech components:

1. the identification of the airport
2. a portion of the radio message transmitted by the pilot in the aircraft 3 so that the pilot can identify that the response he is receiving is associated with his particular aircraft
3. the line of position of the aircraft 3 relative to the station which can be in the form of a succession of numbers which give the angular information
4. additional information such as weather information can also be transmitted from the ground.

Various apparatus known in the prior art can be used for obtaining the desired audio output from the recording system 7 from the digital input. A converter 8, for example, can be a multi-track recording carrier, for instance a magnetic plate or a magnetic cylinder which has stored on three adjacent tracks the numerals 0, 1, 2, 3 – 9 in audio form. Associated with each of the tracks can be a reproduction head each of which is controlled in response to the multi-digital signal at the output 5 of the direction finder 2. If, for example, the angle direction is 025° at the output 5 and the information appears in this digital form, the reproduction head associated with zero will first be switched on during the subsequent audio transmission and subsequently the second reproduction head associated with the numeral 2 in the second channel will be switched on and transmit the word "two." Then, the third reproduction head will be switched on to transmit the word "five." If the angular value of the line of position is not already available as a multi-digit decimal signal but is in the form of an analog signal or in a coding such as binary, it is merely necessary to interpose corresponding analog to digital converters or code converters. It is also possible to record additional speech signals on the same recording carrier on additional tracks such as, for example, call letters such as "QDM", the words "degree" and "end" can be transmitted as well as suitable station identification or similar additional information it is desired to transmit to the aircraft.

Instead of storing natural speech for the line of position angular direction values, it is also possible to artifically compose or synthesize speech information or to use semi-artificial speech formed of fragments.

When several radio direction finders having the same frequency are within reception distance of the radio telephone 4, it is possible to simultaneously request several lines of positions from a single radio call. So as to permit the pilot to receive all of the results as well as identifying and evaluating them so it will be possible to make a fix determination of the aircraft with the help of two lines of positions, each transmitter of each direction finder station may preferably have associated a predetermined time delay before returning the transmission of the direction finder results thus allowing the receiver 4 to individually receive the separate signals and note them before the next signal is transmitted by, the other radio station. A direction finder message might start a return message after 3 seconds, another station may start a return message after 13 seconds, and another station may start after 23 seconds and so on for the fourth and additional stations. Thus, the present invention provides a simple and inexpensive system for automatically transmitting line of positions to aircraft from ground stations without modifying or adding any equipment on aircraft except standard radio telephone transmitter receivers and without substantial expense and modification of ground stations.

Although this invention has been described with respect to preferred embodiments, it is not to be so limited as changes and modifications may be made which are within the full intended scope as defined by the appended claims.

We claim as our invention:

1. A system for automatically obtaining the line of position of an airplane relative to ground station wherein said airplane carries radio telephone equipment on board and said ground station having a direction finder on the ground operating automatically when a signal is received from said airplane within the frequency range of said radio telephone equipment comprising, a recording device connected to said direction finder for automatically storing the line of position of said airplane, a ground transmitter operating at the frequency of said radio telephone device connected to said recording device, and at least a part of the stored message content including said line of position of said airplane automatically transmitted from said ground transmitter to said airplane and detected by said radio telephone equipment on said airplane.

2. A system according to claim 1, wherein said line of position output of said direction finder is a multi-digit digital signal and a converter in said recording system converts it into an audio speech signal which is returned to said airplane.

3. A system according to claim 2, wherein said recording device comprises a multi-track recording carrier with associated recording-reproduction heads, and at least a part of the message content sent by the airplane as well as the information required for the conversion of the digital line of position output into an audible speech are recorded on the tracks of said recording device and the message composed of these individual speech text portions are supplied from said recording device after the direction finding process has been completed and is supplied to said ground transmitter as a modulation signal.

4. A system according to claim 1 for automatic location determination by the use of several radio direction finders located at different points on the ground positioned and tuned to the frequency of the radio telephone equipment on said airplane wherein messages from the individual direction finders are returned to the airplane in a time sequential manner via the associated ground transmitters so as to eliminate radio interference.

5. A system according to claim 1, wherein said ground station also transmits information to identify said ground station direction finder.

6. A system according to claim 1, wherein said ground station also transmits auxilliary information to said airplane.

7. A system according to claim 6, wherein said auxilliary information is weather information.

* * * * *